United States Patent [19]

Nakamichi

[11] 3,883,059

[45] May 13, 1975

[54] DUAL CAPSTAN TYPE TAPE DRIVING MECHANISM FOR A MAGNETIC TAPE MACHINE

[75] Inventor: Niro Nakamichi, Tokyo, Japan

[73] Assignee: Nakamichi Research, Inc., Tokyo, Japan

[22] Filed: July 11, 1974

[21] Appl. No.: 487,553

[30] Foreign Application Priority Data

July 12, 1973 Japan ............................ 48-78711

[52] U.S. Cl. .................. 226/108; 226/61; 226/188

[51] Int. Cl. ........................................ B65h 17/20

[58] Field of Search ........ 226/13, 61, 108, 188, 189

[56] References Cited

UNITED STATES PATENTS

| | | | |
|---|---|---|---|
| 3,447,729 | 6/1969 | Cass | 226/108 X |
| 3,583,618 | 6/1971 | Lewis | 226/108 X |
| 3,741,564 | 6/1973 | Schulz | 226/108 X |

*Primary Examiner*—Richard A. Schacher
*Attorney, Agent, or Firm*—Woodling, Krost, Granger & Rust

[57] ABSTRACT

A dual capstan type tape driving mechanism for a magnetic tape machine comprising a first and a second capstan wheels including a first and a second capstans, respectively, and a drivingly rotating member to drive said first and second capstan wheels, said tape driving mechanism further comprising an inertia applying member disposed just midway of said first and second capstan wheels with a single belt engaging and passing around said first and second capstan wheels, said drivingly rotating member and said inertia applying member so that said first and second capstan wheels and said drivingly rotating member rotate in the same direction, but so that said inertia applying member rotates in the opposite direction, said inertia applying member having an inertia energy of rotation equaling to the sum of those of said first and second capstan wheels and said drivingly rotating member and so disposed that said first and second capstan wheels are symmetrically positioned relative to the straight line connecting between the axes of said drivingly rotating member and said inertia applying member.

6 Claims, 1 Drawing Figure

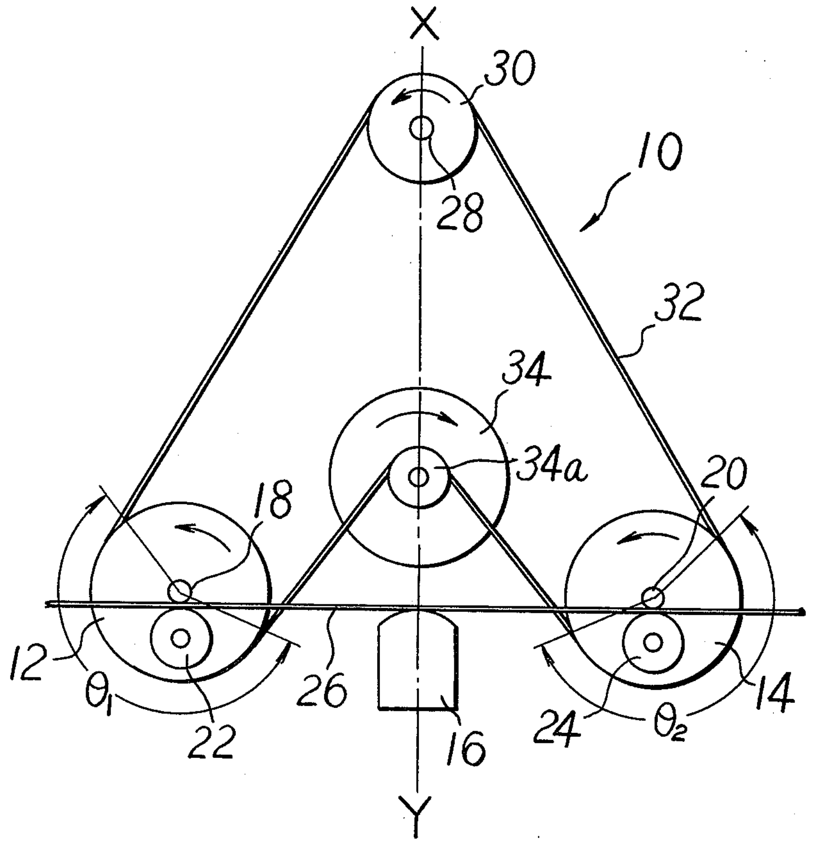
X
30
10
28
32
34
34a
18
20
12
θ1
22
26
16
24
θ2
14
Y

DUAL CAPSTAN TYPE TAPE DRIVING MECHANISM FOR A MAGNETIC TAPE MACHINE

FIELD OF THE INVENTION

This invention pertains generally to a tape driving mechanism and more particularly to a dual capstan type tape driving mechanism for a tape recording and/or reproducing apparatus.

BACKGROUND OF THE INVENTION

A dual capstan type tape driving mechanism for a tape recording and/or reproducing apparatus (referred to as a magnetic tape machine hereinafter) preferably improves the performance of the tape movement because the proper tension is applied to the tape traveling in the apparatus. However, in such type tape driving mechanism, the tape tends to unevenly travel due to the vibration applied to the apparatus from the exterior, resulting in the unpreferable deterioration of the tape traveling performance. Thus, the dual capstan type magnetic tape machine has a tendency to decrease in its effect.

It is because the capstans rotatably move in the same direction that such unevenness occurs in the tape movement. Therefore, in order to remove such drawback of the prior art the dual capstan type tape driving mechanism preferably has the moment of rotation applied thereto in an opposite direction to that of the moment which the wheels of the capstans have. It might be possibly considered that the opposite moment of rotation would be applied by an inertia applying member disposed side by side to the capstans and having a drivingly engaging portion engaging and driving the belt between the capstan wheels. With the inertia applying member driven directly by an electric motor connected thereto, a head in the magnetic tape machine tends to be adversely affected by magnetic flux from the electric motor. With the inertia applying member driven through a belt and pulley assembly by an electric motor disposed far away from the head, additional components such as belt and pulley to transfer power from the motor to the inertia applying member. Thus, the arrangement of the components have been limited in position and therefore, the design of the tape driving mechanism has been considerably restricted.

OBJECT OF THE INVENTION

Accordingly, it is a principal object of the present invention to provide a dual capstan type tape driving mechanism for a magnetic tape machine wherein a tape can evenly travel so as to improve the performance of the tape movement.

It is another object of the present invention to provide a dual capstan type tape driving mechanism wherein an arrangement in the construction can be easily designed.

It is further object of the present invention to provide a dual capstan type tape driving mechanism adapted to be constructed with a simple design.

SUMMARY OF THE INVENTION

In accordance with one aspect of the present invention, there is provided a dual capstan type tape driving mechanism for a magnetic tape machine comprising a first capstan wheel including a first capstan coaxially secured thereto, a second capstan wheel including a second capstan coaxially secured thereto, and a drivingly rotating member associated with both of said first and second capstan wheels so that they are driven in the same direction for movement of a tape engaging said first and second capstans, said tape driving mechanism further comprising an inertia applying member having an inertia energy of rotation equaling to the sum of those of said first and second capstan wheels and said drivingly rotating member; said first and second capstan wheels, said drivingly rotating member and said inertia applying member each being in the form of pulley with a single belt of less expansibility engaging them so that said inertia applying member rotates in the opposite direction to those of said first and second capstan wheels and said drivingly rotating member.

In accordance with another aspect of the present invention there is provided a dual capstan type tape driving mechanism for a magnetic tape machine comprising a first capstan wheel including a first capstan coaxially secured thereto, a second capstan wheel including a second capstan coaxially secured thereto, and a drivingly rotating member associated with both of said first and second capstan wheels so that they are driven in the same direction for movement of a tape engaging said first and second capstans, said tape driving mechanism further comprising an inertia applying member having an inertia energy of rotation equaling to the sum of those of said drivingly rotating member and disposed at the point relative to which said first and second capstan wheels are symmetrically positioned; said drivingly rotating member positioned in a spaced relation from said inertia applying member and at the point relative to which said first and second capstan wheels are symmetrically positioned; said first and second capstan wheels, said drivingly rotating member and said inertia applying member each being in the form of pulley with a single belt of less expansibility engaging them so that said inertia applying member rotates in the opposite direction to those of said first and second capstan wheels and said drivingly rotating member.

BRIEF DESCRIPTION OF THE DRAWING

The above and other objects and features of the present invention will be apparent from the teaching of the preferred embodiment of the present invention taken with reference to the accompanying drawing in which;

a single FIGURE systematically shows in plan view a tape driving mechanism for a tape recording and/or reproducing apparatus (a magnetic tape machine) constructed in accordance with the present invention.

DETAILED DESCRIPTION OF THE PREFERRED EMBODIMENT OF THE PRESENT INVENTION

Referring now to the accompanying drawing, there is shown a tape driving mechanism for a magnetic tape machine indicated generally at numeral 10 which comprises a first capstan wheel 12 and a second capstan wheel 14 disposed in a laterally spaced relation to each other and journalled on a chassis (not shown) of the magnetic tape machine which may be preferably of a cassette type. A magnetic head 16, which may be adapted to record an information thereto and/or reproduce it therefrom, is disposed just midway between the first and second capstan wheels 12 and 14 and adapted to advance to the operating position and withdraw to the non-operating position by any suitable means. A first capstan 18 is coaxially secured to the capstan wheel 12 and similarly a second capstan 20 is coaxially secured to the capstan wheel 14. A first and a second pinch rollers 22 and 24 are disposed in a facing relation to the respective capstans 18 and 20 and adapted to advance so as to engage against the respective capstans 18 and 20 and to withdraw so as to be spaced from the respective capstans 18 and 20 by any suitable means.

A tape 26, which is contained in a cassette (not shown) and wound on a supply and a take up hubs therein, runs between the capstan 18 and the pinch roller 22 and then between the capstan 20 and pinch roller 24 with the tape contacting the head 16 for recording and/or playing back.

There is a power source 28 which may be in the form of an electric motor and which is provided with a drivingly rotating member 30 coaxially secured to the output shaft of the motor 28. The first and second capstan wheels 12 and 14 and the drivingly rotating member 30 are in the form of pulley and have a single belt 32 engaging and passing around the pulleys 12, 14 and 30 so that they rotate in the same direction as shown in the FIGURE. The belt 32 is formed of material such as polyester film (commercially available under the trade name "Myler Film") having flexibility, but less expansibility. It will be seen from the FIGURE that the drivingly rotating member 30 in the form of pulley is disposed far away from the head 16 and at the point to which the first and second capstan wheels 12 and 14 are symmetrically positioned. Thus, the drivingly rotating member 30 faces the head 16.

An inertia applying member 34 is disposed adjacent to the head 16 and at the point to which the first and second capstan wheels 12 and 14 are symmetrically positioned. Thus, a line X-Y connected between the axes of the drivingly rotating member 30 and the inertia applying member 34 comprises a center line relative to which the first and second capstan wheels 12 and 14 are symmetrically disposed. The inertia applying member 34 is provided with an engaging portion 34A in the form of pulley coaxially secured thereto, which the single belt 32 engages and passes around so that the inertia applying member 34 rotates in the opposite direction to those of the first and second capstan wheels and the drivingly rotating member. It should be noted that the inertia applying member 34 has the inertia energy of rotation equaling to the sum of the inertia energies of rotation which the first and second capstan wheels 12 and 14 and the drivingly rotating member 30 have. It will be understood that the inertia energy of each of the components depends upon the r.p.m. and mass of the corresponding component. The inertia applying member 34 may be preferably disposed so that the angles $\theta_1$ and $\theta_2$ over the peripheral length of which the belt 32 engages the capstan wheels 12 and 14 are sufficient to provide much frictional force between the belt 32 and the capstan wheels 12 and 14.

With the present tape driving mechanism abovementioned, even though vibration from the exterior will be applied to the tape driving mechanism, the latter is under no influence because the inertia energy of the inertia applying member is equal to the sum of those of the capstan wheels 12 and 14 and the drivingly rotating member 30 and also opposite in direction to those of the first and second capstan wheels 12 and 14 and the drivingly rotating member 30. Thus, the tape 26 can be evenly transported in spite of the vibration applied from the exterior. In addition, since the first and second capstan wheels 12 and 14 are symmetrically disposed relative to the straight line X-Y between the axes of the drivingly rotating member 30 and the inertia applying member 34, the belt 32 runs in a symmetric pattern as shown in the FIGURE and therefore, engages the first and second capstan wheels 12 and 14 at the same angles $\theta_1$ and $\theta_2$, respectively, resulting that influence of vibration from the exterior is easily balanced between the righthand portion and the lefthand portion of the tape relative to the line X-Y. Thus, it will be understood that wow or flutter never occurs in the tape engaging the head 16. Although the belt is preferably non-expansible, it will be understood from the foregoing that it is not required to be ideally non-expansible. Also, it should be noted that the drivingly rotating member 30 driven by the motor is far away from the head 16 so that the latter is under no influence of magnetic flux from the motor. It should be also noted that only one belt is used to drive the first and second capstan wheels 12 and 14 and the inertia applying member 34 by the drivingly rotating member 30.

While one preferred embodiment of the present invention has been shown and described with reference to the accompanying drawing, it is only by way of exemplification. It will be understood by those skilled in the art that various modifications and changes might be made within the spirit and scope of the present invention, which is intended to be defined by the appended claims.

What is claimed is;

1. A dual capstan type tape driving mechanism for a magnetic tape machine comprising a first capstan wheel including a first capstan coaxially secured thereto, a second capstan wheel including a second capstan coaxially secured thereto, and a drivingly rotating member associated with both of said first and second capstan wheels so that they are driven in the same direction for movement of a tape engaging said first and second capstans, said tape driving mechanism further comprising an inertia applying member having an inertia energy of rotation equaling to the sum of those of said first and second capstan wheels and said drivingly rotating member; said first and second capstan wheels, said drivingly rotating member and said inertia applying member each being in the form of pulley with a single belt of less expansibility engaging them so that said inertia applying member rotates in the opposite direction to those of said first and second capstan wheels and said drivingly rotating member.

2. A dual capstan type tape driving mechanism for a magnetic tape machine as set forth in claim 1, wherein said drivingly rotating member is connected to an electric motor and so sufficiently far away from a head in the magnetic tape machine that said head is under no influence of magnetic flux from said electric motor.

3. A dual capstan type tape driving mechanism for a magnetic tape machine as set forth in claim 1, wherein said inertia applying member is so disposed that said belt engages said first and second capstan wheels over the peripheral lengths of relatively larger angles, respectively.

4. A dual capstan type tape driving mechanism for a magnetic tape machine comprising a first capstan wheel including a first capstan coaxially secured thereto, a second capstan wheel including a second capstan coaxially secured thereto, and a drivingly rotating member associated with both of said first and second capstan wheels so that they are driven in the same direction for movement of a tape engaging said first and second capstans, said tape driving mechanism further comprising an inertia applying member having an inertia energy of rotation equaling to the sum of those of said drivingly rotating member and disposed at the point relative to which said first and second capstan wheels are symmetrically positioned; said drivingly rotating member positioned in a spaced relation from said inertia applying member and at the point relative to which said first and second capstan wheels are symmetrically positioned; said first and second capstan wheels, said drivingly rotating member and said inertia applying member each being in the form of pulley with a single belt of less expansibility engaging them so that said inertia applying member rotates in the opposite direction to those of said first and second capstan wheels and said drivingly rotating member.

5. A dual capstan type tape driving mechanism for a magnetic tape machine as set forth in claim 4, wherein said drivingly rotating member is connected to an electric motor and so sufficiently far away from a head in the magnetic tape machine that said head is under no influence of magnetic flux from said electric motor.

6. A dual capstan type tape driving mechanism for a magnetic tape machine as set forth in claim 4, wherein said inertia applying member is so disposed that said belt engages said first and second capstan wheels over the peripheral lengths of relatively larger angles, respectively.

* * * * *